US007447765B2

(12) United States Patent
Aerrabotu et al.

(10) Patent No.: US 7,447,765 B2
(45) Date of Patent: Nov. 4, 2008

(54) PACKET FILTERING FOR EMERGENCY ACCESS IN A PACKET DATA NETWORK COMMUNICATION SYSTEM

(75) Inventors: Naveen Aerrabotu, Gurnee, IL (US); Lawrence A. Willis, McHenry, IL (US); Mark E. Pecen, Palatine, IL (US); Yilin Zhao, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 732 days.

(21) Appl. No.: 10/437,667

(22) Filed: May 14, 2003

(65) Prior Publication Data

US 2004/0199914 A1   Oct. 7, 2004

Related U.S. Application Data

(63) Continuation-in-part of application No. 10/403,946, filed on Mar. 31, 2003.

(51) Int. Cl.
G06F 15/16 (2006.01)
H04Q 7/20 (2006.01)

(52) U.S. Cl. ............... 709/224; 709/227; 370/238; 455/445

(58) Field of Classification Search ............... 709/224, 709/238, 227, 229; 455/404.1, 414, 404; 370/401, 238; 726/3
See application file for complete search history.

(56) References Cited

U.S. PATENT DOCUMENTS 5,727,146 A * 3/1998 Savoldi et al. ............... 726/3

6,014,555 A * 1/2000 Tendler ............... 455/404.1
6,104,929 A   8/2000 Josse et al.
6,125,283 A   9/2000 Kolev et al.

(Continued)

FOREIGN PATENT DOCUMENTS

WO          02080499 A1   10/2002

OTHER PUBLICATIONS

"3GPP Generation Partnership Project; Technical Specification Group Core Network; Packet Domain; Mobile Station (MS) supporting Packet Switched Services" (3GPP TS 27.060) vol. 5.3.0, Dec. 2002.

(Continued)

Primary Examiner—Khanh Dinh
(74) Attorney, Agent, or Firm—Randall S. Vaas; Daniel C. Crilly

(57) ABSTRACT

A method and apparatus method of filtering packet data for an anonymous user device in a packet data network communication system includes a first step of defining a special context information element containing special context information. A next step includes sending the special context information element in an activate packet data protocol (PDP) context request to a network to initiate a call from an anonymous user device. A next step includes receiving the activate PDP context request and the special context information element. A next step includes configuring the data packets so that only the special context is allowed. A next step includes assigning an interim identity and interim IP address to the user device. A next step includes mapping the data packets of the configuring step to the interim IP address of the user device. A next step includes defining permissible routing identities per the special context. A next step includes routing the data packets between only those permissible routing identities from the defining step.

16 Claims, 6 Drawing Sheets

U.S. PATENT DOCUMENTS

| | | | |
|---|---|---|---|
| 6,240,462 B1* | 5/2001 | Agraharam et al. | 709/238 |
| 6,542,739 B1* | 4/2003 | Garner | 455/427 |
| 6,571,092 B2* | 5/2003 | Faccin et al. | 455/404.1 |
| 6,635,491 B1 | 10/2003 | Khalil et al. | |
| 6,687,252 B1 | 2/2004 | Bertrand et al. | |
| 7,058,403 B2* | 6/2006 | Zhao et al. | 455/435.1 |
| 2002/0086659 A1 | 7/2002 | Lauper | |
| 2002/0111159 A1 | 8/2002 | Faccin et al. | |
| 2002/0163906 A1 | 11/2002 | Diachina et al. | |
| 2003/0027554 A1* | 2/2003 | Haumont | 455/414 |
| 2003/0126468 A1 | 7/2003 | Markham | |
| 2003/0211839 A1 | 11/2003 | Baum et al. | |
| 2004/0002814 A1* | 1/2004 | Gogic | 701/214 |
| 2004/0190522 A1 | 9/2004 | Aerrabotu et al. | |
| 2004/0192251 A1* | 9/2004 | Zhao et al. | 455/404.1 |
| 2004/0242191 A1 | 12/2004 | Hossain et al. | |
| 2005/0169208 A1* | 8/2005 | Carrion-Rodrigo et al. | 370/328 |
| 2006/0029084 A1* | 2/2006 | Grayson | 370/401 |
| 2007/0060097 A1* | 3/2007 | Edge et al. | 455/404.1 |
| 2007/0254625 A1* | 11/2007 | Edge | 455/404.1 |

OTHER PUBLICATIONS

"3GPP Generation Partnership Project; Technical Specification Group Core Network; Mobile Radio interface Layer 3 specification; Core network protocols; Stage3." (3GPP TS 24.008) vol. 6.0.0, Mar. 2003.

Office Action for U.S. Appl. No. 10/403,946, dated Aug. 9, 2007 (11 pages).

Request for Continued Examination and Amendment for U.S. Appl. No. 10/403,946, dated Jul. 27, 2007 (10 pages).

Final Office Action for U.S. Appl. No. 10/403,946, dated Nov. 27, 2006 (13 pages).

Amendment for U.S. Appl. No. 10/403,946, dated Sep. 15, 2006 (7 pages).

Office Action for U.S. Appl. No. 10/403,946, dated Mar. 15, 2006 (12 pages).

Response To Notice of Non-Compliant Amendment for U.S. Appl. No. 10/403,946, dated Dec. 20, 2005 (7 pages).

Notice of Non-Compliant for U.S. Appl. No. 10/403,946, dated Dec. 8, 2005 (2 pages).

Request For Continued Examination and Amendment for U.S. Appl. No. 10/403,946, dated Dec. 1, 2005 (8 pages).

Office Action for U.S. Appl. No. 10/403,946, dated Jun. 1, 2005 (9 pages).

Request for Reconsideration for U.S. Appl. No. 10/403,946, dated Mar. 4, 2005 (3 pages).

Office Action for U.S. Appl. No. 10/403,946, dated Oct. 4, 2004 (7 pages).

\* cited by examiner

PACKET FILTERING FOR EMERGENCY ACCESS IN A PACKET DATA NETWORK COMMUNICATION SYSTEM

CROSS-REFERENCE TO RELATED APPLICATION

This application is a continuation-in-part of co-pending parent U.S. patent application Ser. No. 10/403,946 by inventors Aerrabotu et al., filed on Mar. 31, 2003. The related application is assigned to the assignee of the present application, and is hereby incorporated herein in its entirety by this reference thereto.

FIELD OF THE INVENTION

The present invention relates generally to wireless communications, and in particular, the present invention relates to filtering of packet data for a radiotelephone without a valid identity in a packet data network.

BACKGROUND OF THE INVENTION

In telecommunications systems, a mobile device includes hardware and software specific to a radio interface, along with subscriber specific data located in an identity module. For example, the Global System for Mobile Communications (GSM) system uses a subscriber identity module (SIM). The Universal Mobile Telephone Service (UMTS), which is a third generation wireless network standard enhancing GSM and WCDMA, uses a Universal SIM (USIM). The CDMA-2000 or CDMA-one system uses a Removable User Identity Module (R-UIM), which can all generally be referred to as SIM. The SIM can either be a smart card having physical dimensions similar to the well-known size of credit cards, or alternately can be "cut" to a much smaller format, commonly referred to as a 'plug-in SIM". In either case, the SIM card contains and organizes information, such as identity information identifying the subscriber as a valid subscriber, subscriber supplied information, such as telephone numbers, for example, operator specific information, and a certain subset of mobility management state information, such as information about the last public land mobile network (PLMN) in which the mobile device was registered.

Normally, without an identity module in place, a call will not be accepted on a communication network. However, the Federal Communication Commission has mandated that a phone without an identity module, or even a phone number, must be able to place emergency calls (E911) in a communication system and must have an identifier. Moreover, a receiving call center must have the ability to callback the initiating device to confirm that the emergency call was legitimately placed or for security reasons within the FCC mandated callback time, which is usually forty-five minutes. This raises problems of how to contact a device without an identity. This problem is compounded in packet-switched networks where individual packets must be addressed properly. Further, if an anonymously placed call is given a temporary identity to access a packet data network, then this opens an opportunity to the user of the anonymous device to access the network and to use services beyond the Emergency Packet Services or to use or receive services to which the subscriber is not allowed.

Techniques have recently become available for a mobile subscriber, either on GSM General Packet Radio Service (GPRS) and Enhanced Data for Global Evolution (EDGE), or on UMTS, to place an anonymous call, such as an emergency call, in either a circuit-switched or a packet-switched data domain without a SIM card. However, these techniques do not address the case where the temporarily addressed access for the anonymous device is left open after an emergency call is ended, leaving the possibility of further unauthorized access to or from the network.

In addition, future support of emergency packet data for mobile terminals raises risks of system abuse by users of this service. This service should be used only in case of emergency such as Voice over Internet Protocol (VoIP) 911 call or other value added emergency services. In packet data there is a window of opportunity to abuse the allowed context for non-emergency purposes.

Accordingly, what is needed is a method and apparatus for enabling the call connection and callback of anonymous user device in a packet-switched data domain while preventing further unauthorized use outside of the original purpose of the call. It would also be of benefit to develop a method to notify a Gateway GPRS Service Node (GGSN) that the particular context is for emergency signaling only. This allows the GGSN to configure the context so that only emergency traffic is allowed.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENT

Figure 1:
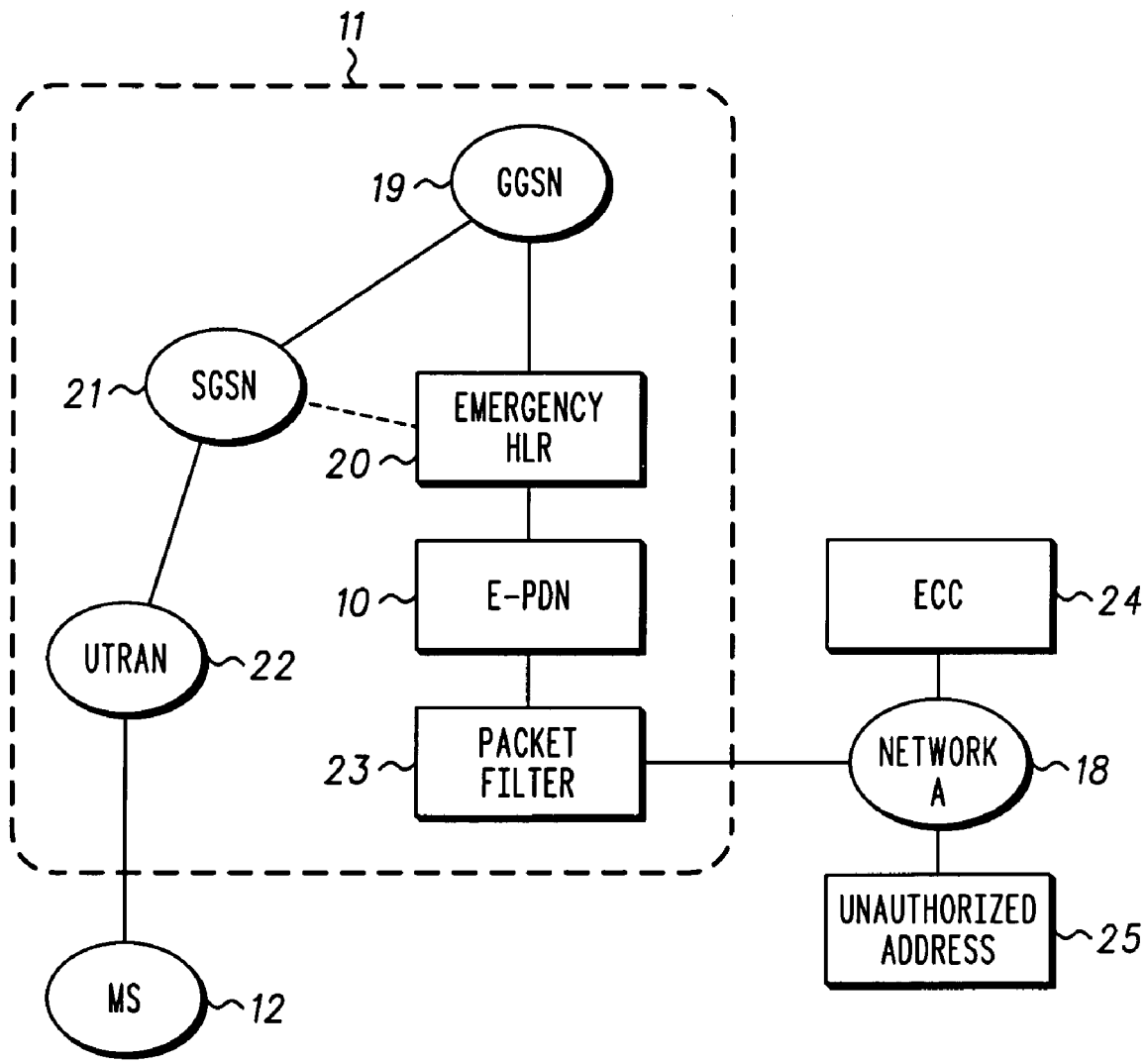
FIG. 1 shows a simplified schematic diagram of an anonymous mobile unit, networks, and called party, in accordance with the present invention.

The present invention provides a method and apparatus for enabling the call connection and callback of an anonymous user device in a packet-switched data domain, while preventing further unauthorized use outside of the original purpose of the call. The problems and issues seen with anonymous access are resolved in the present invention through the use of a packet filter associated with each public land mobile network (PLMN), as shown in FIG. 1. A packet data filter 23 of the network 11 controls authorized communication of a user device 12, such as a mobile station (MS) radiotelephone, even when the device does not have a valid identity. This is of particular importance where a temporary address is assigned to the MS for a call to an Emergency Call Center (ECC) 24, for example and the address is left open after the emergency call is ended, which provides a communication pipe to and from the device 12 that is open to unauthorized addresses 25.

The present invention enables network access for an anonymous caller (i.e. with the absence of a subscriber identity module (SIM) card) with a minimal impact on the existing standardized signaling protocol. An emergency or interim international mobile subscriber identity (IMSI) is generated in response to the SIM card not being positioned within the mobile user device so that the interim IMSI is utilized to provide identity information corresponding to the SIM card when the SIM card is not inserted within the mobile user device. This functionality is facilitated by the network, and particularly an Emergency Packet Data Network (E-PDN) 10, to provide an interim address for the anonymous caller in order to place a call, such as an emergency E911 call. The packet data filter 23 further restricts the call such that the anonymous device 12 can only transfer data packets with an authorized user, such as ECC 24. Although the packet data filter is shown as coupled to the E-PDN 10, the present invention works equally well with the packet filter 23 located anywhere in the network. For example, the packet filter could be part of the GGSN 19 or SGSN 21.

The interim address capabilities of the can be provided by the Emergency Packet Data Network 10 incorporated within each PLMN 11. For example, the E-PDN 10 can be included within a Server GPRS Service Node (SGSN) 21 or preferably a Gateway GPRS Service Node (GGSN) 19 of the network 11. However, the E-PDN can be contained within other location such as an Emergency Home Location Register (HLR) 20 as described in WO 02/080499, "Method and Apparatus for Anonymous Network Access in the Absence of a Mobile Subscriber Identity Module", by Pecen et al., herein incorporated by reference.

The Emergency Packet Data Network 10 implements a set of IP addresses that can be assigned to an anonymous mobile 12 upon initiation of a call. This ability to assign IP addresses allows the packet data network to correctly forward data packets from an anonymous caller, between networks, to a called party, while also providing callback access across the networks. The E-PDN 10 also allows the service provider to isolate the Emergency Traffic from the rest, and provides flexibility for effective monitoring. The service providers can route this traffic, if-needed, with dedicated network entities. The E-PDN 10 can be combined in an Emergency HLR 20 or could be part of the GGSN or an equivalent in a CDMA-1X communication system. However, it should be recognized that the present invention has application in other systems, including GSM and CDMA systems, given the appropriately formatted MS identity assignments. The present invention provides particular application in allocating IP addresses from the E-PDN block when the mobile station subscriber does not have an identity (i.e., no SIM, R-UIM, USIM, phone number). However, the present invention can also be used even where a mobile station includes an identity (i.e., SIM, R-UIM, USIM, or at least a phone number).

Inasmuch as the mobile station does not have a subscriber identity in the application of the present invention, any assigned IP address must be matched to a particular user device. This is accomplished through the use of a unique International Mobile Equipment Identity (IMEI) code contained within the mobile unit itself, which could be the unit's serial number. In application, an emergency International Mobile Subscriber Identity (IMSI) is used as the mobile station (MS) identity in a GPRS attach procedure when the MS does not have a SIM. This Emergency IMSI consists of a unique pair of Mobile Country Code (MCC) and Mobile Network Code (MNC) as well as a set of pseudo-random bits containing a portion of the International Mobile Equipment Identity (IMEI). Note that the MCC number 901 and MNC number 08 can be used in the Emergency IMSI, in accordance with recommended procedures. The E-PDN then associates or maps the assigned IP address to the unit's IMSI or IMEI.

The Emergency IMSI would then be used to perform an Emergency GPRS Attach procedure in the packet-switched domain. The network operator would have full control over whether or not to enable this special emergency calling service, which is applicable in countries in which regulators require that a SIM card be used for emergency calls. The mobile user equipment would be granted a "special Emergency GPRS attach" of sorts, which would enable the mobile station to activate a special emergency signaling Packet Data Protocol (PDP) context. The emergency signaling PDP context would then be used for initiation of an emergency call in an internet messaging system. In this case the mobile equipment would obtain an IP address for the emergency call from the E-PDN as part of the emergency signaling PDP context activation procedure. If the emergency call is to be placed via the internet messaging subsystem, a Public User Identity in the format "user@host" can also be obtained for addressing. This Public User Identity would have the user part based on the Special Emergency IMSI and a predefined reserved domain name for the host's part indicating that this is an emergency call without a SIM.

The emergency signaling PDP context would be recognized by the Packet Filter, in that, the packet filter can check if the incoming IP address from the device belongs to the class of interim E-PDN IP addresses. If so, the packet filter then would regulate packet flow, which could only be used for IM subsystem signaling since all traffic on this context would only be allowed to go to the Emergency Calling Center (ECC), ensuring that only emergency calls could be placed using this PDP context. If not, the packet filter could block the flow, redirect the flow to a third party for review, or restrict the flow using level of service rules. The ECC could utilize the IP address information (or Public User Identity) to optionally filter out multiple false emergency calls being made by the same mobile without a SIM in order to prevent denial of service type attacks on the ECC. Moreover, the ECC could utilize the IP address information (or Public User Identity) to callback the mobile device if the call is dropped to confirm the legitimacy of the emergency.

Figure 2:
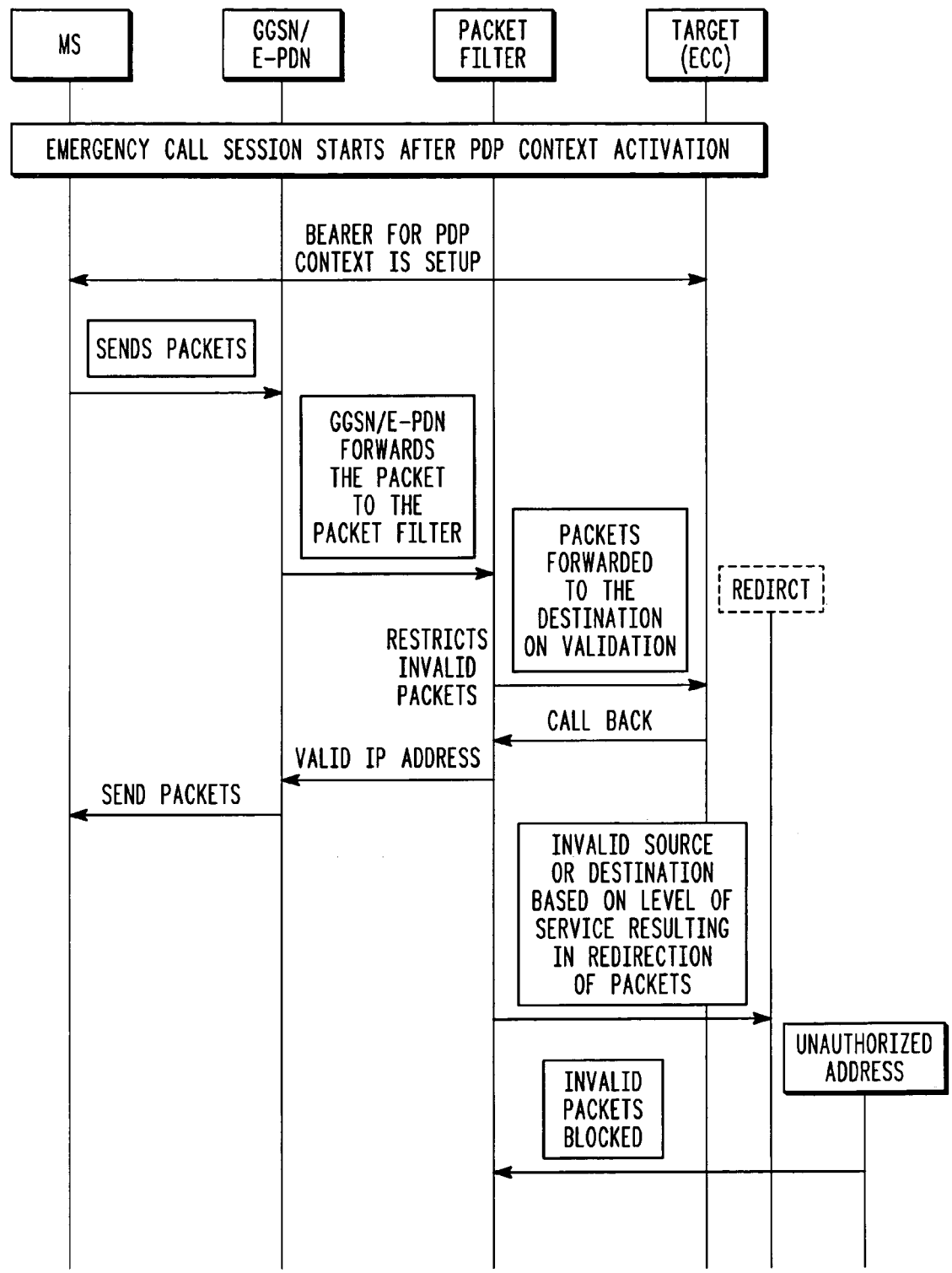
FIG. 2 illustrates the interaction between a mobile unit and a network, in accordance with the present invention.

Referring to FIGS. 1 and 2, an example will be shown below where a mobile station makes an emergency call. It is assumed that the mobile station has no identity, such as a SIM card or even a phone number. The mobile station 12 initiates the packet data emergency call by attaching to a UMTS Terrestrial Radio Access Network (UTRAN) 22, and activating a PDP context request with the SGSN 21. The MS initiates the GPRS attach procedure by the transmission of an Attach Request message to the SGSN 21. If the MS is unidentified in the SGSN, the SGSN sends an Identity Request (Identity Type=Emergency IMSI) to the MS. The MS responds with Identity Response (Emergency IMSI).

The mobile user device includes an interim identity generator for generating the interim International Mobile Subscriber Identity (IMSI), and a SIM detector for detecting the presence of a SIM card within the user device. The user device also includes a memory for storing local information, such as local information containing an international mobile equipment identity (IMEI) corresponding to the user device, local information including an electronic serial number of the user device, local information containing the IMSI, and interim or emergency 1P address information received from the E-PDN.

The SIM detector detects the presence of SIM card within the user device, and informs the interim identity generator when the SIM card is not positioned within the user device. As a result, according to the present invention, when the SIM card is not inserted within the user device, the interim identity generator generates an interim International Mobile Subscriber Identity (IMSI), which is then available to a radio interface layer signaling stack of the user device in the absence of the SIM card. This generated interim IMSI would then be used to perform an anonymous IMSI GPRS attach procedure in the packet-switched domain, as described above. An operator of a radio access network would have full control over whether or not to enable the anonymous calling procedure, such as for emergency calling service for example, and which is applicable in countries in which regulators require that SIM card be used for emergency calls. Optionally, the mobile user device can be granted a special anonymous GPRS attach of sorts, which would enable mobile user device to receive data calls as well.

The generated interim IMSI of the present invention would conform to the length characteristics of a known IMSI, and is therefore up to fifteen digits in length and is encoded as a series of four-bit quantities. For example, the interim identity generator can generate an interim IMSI that includes an interim mobile country code (MCC), and an interim mobile network code (MNC), along with a set of pseudo-random digits. According to the present invention, the interim mobile country code and interim mobile network code correspond respectively to a predetermined unused mobile country code and a predetermined unused mobile network code. The pseudo-random digits contain, for example, a portion of the international mobile equipment identity (IMEI) associated with mobile user device, and in this manner the call could be traced to an equipment owner.

Upon receipt of the interim or emergency identity (IMSI), the SGSN 21 establishes a PDP context for the mobile station 12 with the GGSN 19 including the interim or emergency identity. The GGSN acknowledges the PDP Context, and the Emergency Packet Data Network, residing in the GGSN in this example, acknowledges the emergency identity, and allocates an IP address from a predetermined list therein and maps it to the emergency identity. The E-PDN then stores this mapped IP address/identity. Optionally, the E-PDN returns the IP address associated with the interim identity to the user device 12 for storage therein.

The emergency call can then be setup between the GGSN/E-PDN and an Emergency Call Center using the IP address, whereupon a pipe (bearer) for the PDP context is setup for the transfer of packet data from the device to the target destination (e.g., ECC). The mobile station (MS) sends its first emergency call packets to the network (GGSN/E-PDN). Since the user device does not have a valid identity, an interim IP address is assigned (by the E-PDN), as described above. The GGSN then forwards the packets with the assigned interim IP address to the Packet Filter. The Packet Filter checks to see if the call is not-authorized (e.g., not an emergency, presence of an adult supervision block, etc.) and if the incoming IP address from the device belongs to the class of interim E-PDN IP addresses. If the call is invalid for having an improper authorization or source IP address, then the packets are restricted to a predetermined level of service access, blocked, and/or redirected to an authorized third party (e.g., parents, police) for review. However, if the call is validated for being authorized and having a valid interim IP address, the packet networks are directed to forward the packet data along with the interim IP address to the address of a known target destination (e.g., ECC), depending on the class of the call (e.g., emergency). The call is completed normally through the networks 11, 18 to the emergency call center 24 (e.g., though a public switched telephone network) using known procedures for the GPRS/UMTS system with the assigned interim IP address for the MS.

At this point, the emergency call session proceeds normally. In detail, the user device 12 transmits packet-switched data (VoIP) through the air interface to, and receives packet-switched data through the air interface from1 the radio access network 22. The packet-switched data received from the user device 12 is transmitted by the radio access network 22 to a Serving GPRS Support Node (SGSN) 21, which then transmits the packet-switched data to a Gateway GPRS Support Node (GGSN) 19. GGSN 19 converts the packet-switched data from a domain associated with the radio access network 22 to a domain associated with a packet data network (not shown) and transmits the converted packet-switched data to the packet data network for connection to an Emergency Call Center (ECC) 24. Similarly, a callback using packet-switched data received from the ECC 24 through the packet data network 10 is converted by the GGSN 19 from the domain associated with packet data network 10 to the domain associated with the radio access network 22. The converted packet-switched data is then transmitted from the GGSN 19 to the radio access network 22 through the SGSN 21. The radio access network 22 then transmits the packet-switched data to the mobile user device 12 along the air interface.

When the call is disconnected or ended, the ECC is able to callback to the interim IP address of the mobile that originally initiated the emergency call. This can be done to determine if the emergency is legitimate, as is necessary under FCC rules, or to obtain further information. The ECC will route the call to the last known PLMN. As the network and packet filter are familiar with the emergency IP addresses on the E911 system, the packet filter and network will recognize the callback as being from a valid IP address, and send the callback packets to the anonymous user device assigned to that interim IP address.

However, if there is an attempt by an unauthorized address to send information to the interim IP address, the packet filter will recognize that the incoming IP address is not one of the known emergency IP addresses used in the original call and can block the invalid packets from reaching the user device. This provides an advantage since the ending of the emergency call does not necessary close the data pipe to the MS, and information from any other source could access the user device through the interim IP address without the packet filter being there to prevent this unauthorized use.

As shown in FIG. 2, it is preferred that the packet filter functionality is separate from the GGSN, as the packet filter should to be separated from the GGSN application functionalities. Therefore, the GGSN and packet filter are two separate entities in the network with different responsibilities.

Figure 3:
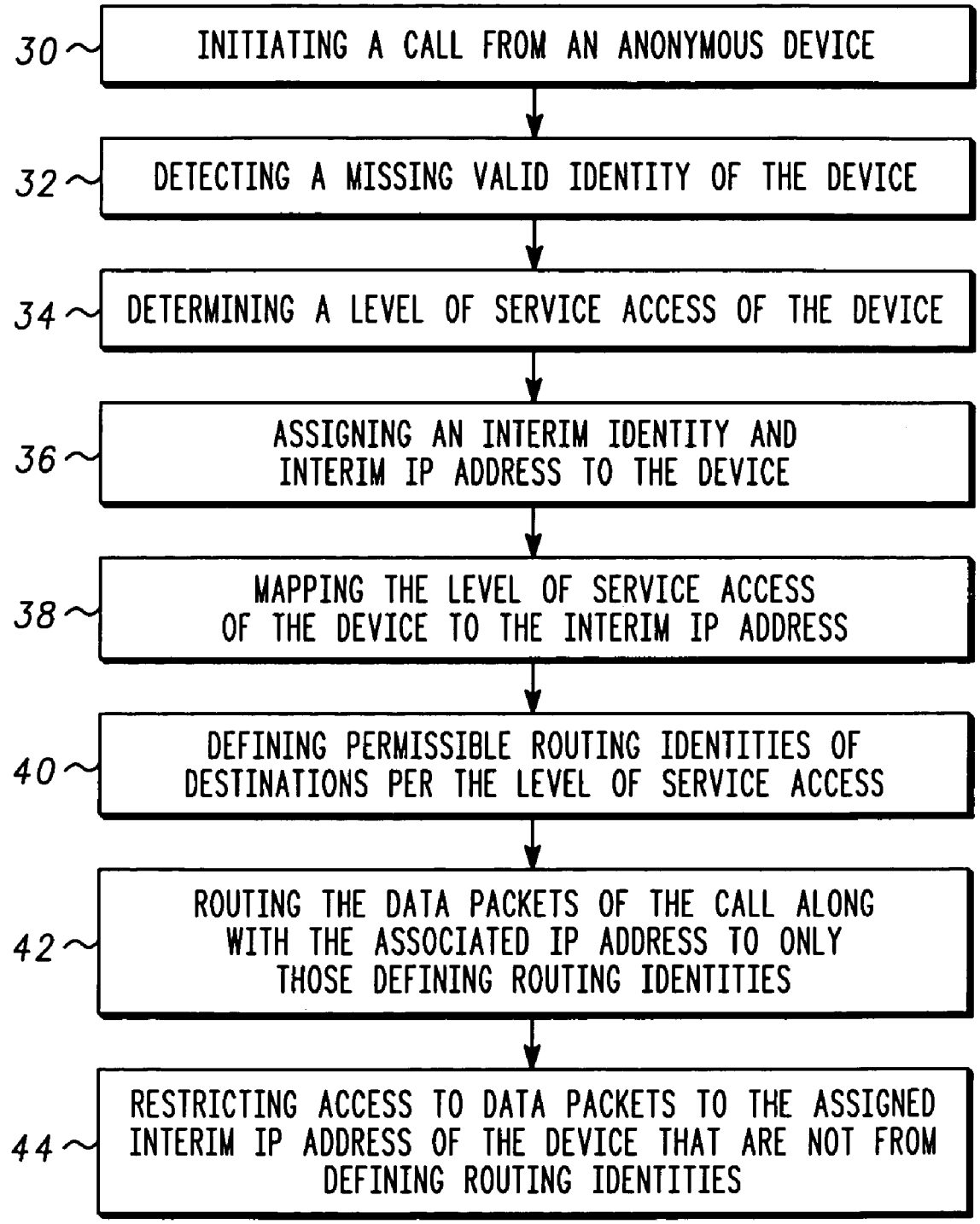
FIG. 3 illustrates a flow chart of method of anonymous operation, in accordance with the present invention.

FIG. 3 is a data flow diagram for a method of filtering packet data for an anonymous user device in a packet data network communication system, in accordance with the present invention. As illustrated, a first step 30 includes initiating a call from an anonymous user device on an home network. If the user device does not have a SIM card, an interim equipment identity, such as an emergency identity (IMSI or IMEI), is generated.

A next step includes detecting 32 a missing identity of the user device by the home network. The network determines whether a valid identity is missing and whether the particular call is an emergency and should be allowed. Allowability is found by determining 34 a level of service access (e.g. emergency access) of the data packets from the user device. If the anonymous call is allowed, a next step 36 includes allocating or assigning an interim identity and interim IP address to the user device, such as an emergency IP address assigned by the E-PDN from a predetermined list, as explained above. The E-PDN is associated with the network and is preferably contained within a Gateway GPRS Service Node (GGSN) of the packet data network. Optionally, the emergency packet data network communicates with a GGSN of the packet data network through an emergency home location register (HLR). The interim IP address is mapped 38 to the equipment identity of the user device and stored.

The permissible target destination of the call is defined 40 per the level of service access granted. For example, if the call is an emergency call, it can only be routed to known identities (i.e., IP addresses) of predetermined emergency calling centers (ECCs). In addition, the present invention provides that the interim IP address of the user device can only be accessed (i.e., called back) by the IP address of the ECC that was called. The packet filter performs this function by restricting access 44 to data packets addressed to the assigned interim IP address of the anonymous user device that are not from a defined routing identity (ECC). Preferably, the packet filter is separate from a Gateway GPRS Service Node (GGSN) of the packet data network due to different functionalities. At this time, the packets of the call can be routed 42 with the associated interim identity of the user device to only those target destinations defined in step 40 above such as the Emergency Call Center, and the call can proceed as normal.

As is presently known, in order to activate a PDP context the mobile station sends a PDP context Activate message to the network. This message is sent by the MS to the network to request activation of a PDP context. Table 1 shows an example of the message content of an Activate PDP Context Request, as obtained in 3GPP TS 24.008, 3rd Generation Partnership Project; Technical Specification Group Core Network; Mobile radio interface Layer 3 specification; Core network protocols; Stage 3 (Release 6), version 6.0.0 (2003-03), table 9.5.1, wherein the descriptions for the type/references are in the sections of same, as identified in the table, and hereby incorporated by reference. Table 1 identifies the respective information elements presently defined for the activate PDP context request message content. The present invention described the addition of an addition information element that is used to notify a Gateway GPRS Service Node (GGSN) that the particular context is for emergency signaling only. This then allows the GGSN to configure the context so that only emergency traffic is allowed.

TABLE 1

ACTIVATE PDP CONTEXT REQUEST message content

| IEI | Information Element | Type/Reference | Presence | Format | Length |
|---|---|---|---|---|---|
| | Protocol discriminator | Protocol discriminator 10.2 | M | V | ½ |
| | Transaction identifier | Transaction identifier 10.3.2 | M | V | ½-3½ |
| | Activate PDP context request message identity | Message type 10.4 | M | V | 1 |
| | Requested NSAPI | Network service access point identifier 10.5.6.2 | M | V | 1 |
| | Requested LLC SAPI | LLC service access point identifier 10.5.6.9 | M | V | 1 |
| | Requested QoS | Quality of service 10.5.6.5 | M | LV | 13 |
| | Requested PDP address | Packet data protocol address 10.5.6.4 | M | LV | 3-19 |
| 28 | Access point name | Access point name 10.5.6.1 | O | TLV | 3-102 |
| 27 | Protocol configuration options | Protocol configuration options 10.5.6.3 | O | TLV | 3-253 |

The mobile can communicate special requirements for the context using the protocol configuration options. Currently protocol configuration options are used for many different purposes such as DNS Server Discovery, P-CSCF Discovery etc. The protocol configuration options information element of the present invention is used to transfer external network protocol options associated with a PDP context activation, and transfer additional (protocol) data (e.g. configuration parameters, error codes or messages/events) associated with an external protocol or an application.

In particular, the protocol configuration options information element is a type 4 information element with a minimum length of 2 octets and a maximum length of 253 octets. The protocol configuration options information element of the present invention is coded as shown in Table 2, taken from 3GPP TS 24.008, figure 10.5.136, as follows.

TABLE 2

Protocol configuration options information element

| 8 | 7 | 6 | 5 | 4 | 3 | 2 | 1 | |
|---|---|---|---|---|---|---|---|---|
| Protocol configuration options IEI | | | | | | | | octet 1 |
| Length of protocol config. options contents | | | | | | | | octet 2 |
| 1 ext | 0 | 0 | 0 | 0 | Configuration protocol | | | octet 3 |
| | | Spare | | | | | | |
| Protocol ID 1 | | | | | | | | octet 4 octet 5 |
| Length of protocol ID 1 contents | | | | | | | | octet 6 |
| Protocol ID 1 contents | | | | | | | | octet 7 ... octet m |
| Protocol ID 2 | | | | | | | | octet m + 1 octet m + 2 |
| Length of protocol ID 2 contents | | | | | | | | octet m + 3 |
| Protocol ID 2 contents | | | | | | | | octet m + 4 ... octet n |
| ... | | | | | | | | octet n + 1 ... octet x |
| Protocol ID n-1 | | | | | | | | octet x + 1 octet x + 2 |
| Length of protocol ID n-1 contents | | | | | | | | octet x + 3 |
| Protocol ID n-1 contents | | | | | | | | octet x + 4 ... octet y |
| Protocol ID n | | | | | | | | octet y + 1 octet y + 2 |
| Length of protocol ID n contents | | | | | | | | octet y + 3 |
| Protocol ID n contents | | | | | | | | octet y + 4 ... octet z |
| Container ID 1 | | | | | | | | octet z + 1 octet z + 2 |
| Length of container ID 1 contents | | | | | | | | octet z + 3 |
| Container ID 1 contents | | | | | | | | octet z + 4 ... octet w |
| ... | | | | | | | | octet w + 1 ... octet u |
| Container ID n | | | | | | | | octet u + 1 octet u + 2 |
| Length of container ID n contents | | | | | | | | octet u + 3 |
| Container ID n contents | | | | | | | | octet u + 4 ... octet v |

The configuration protocol (for octet 3 of Table 2) of the protocol configuration options information element of the present invention is coded as shown in Table 3, derived and modified (see underlined portion) from 3GPP TS 24.008, table 10.5.154, with the novel protocol configuration options of the present invention appearing as the Emergency Traffic Flag information element. Emergency Traffic Flag as part of the PCO tells the GGSN to limit the traffic on this context to emergency signaling only. GGSN can configure any appropriate technique or algorithm to do packet screening and restriction on this context.

TABLE 3

Configuration protocol (octet 3)

Bits
3 2 1
0 0 0       PPP for use with IP PDP type
All other values are interpreted as PPP in this version of the protocol.
After octet 3, i.e. from octet 4 to octet v, two logical lists are defined:
the Configuration protocol options list (octets 4 to z), and
the Additional parameters list (octets z + 1 to v).
Configuration protocol options list (octets 4 to z)

The configuration protocol options list contains a variable number of logical units, the may occur in an arbitrary order within the configuration protocol options list. Each unit is of variable length and consists of a:
protocol identifier (2 octets);
the length of the protocol identifier contents of the unit (1 octet); and
the protocol identifier contents itself (n octets).

TABLE 3-continued

The protocol identifier field contains the hexadecimal coding of the configuration protocol identifier. Bit 8 of the first octet of the protocol identifier field contains the most significant bit and bit 1 of the second octet of the protocol identifier field contains the least significant bit.
If the configuration protocol options list contains a protocol identifier that is not supported by the receiving entity the corresponding unit shall be discarded. The length of the protocol identifier contents field contains the binary coded representation of the length of the protocol identifier contents field of a unit. The first bit in transmission order is the most significant bit.
The protocol identifier contents field of each unit contains information specific to the configuration protocol specified by the protocol identifier.
PPP At least the following protocol identifiers (as defined in RFC 1700) shall be supported in this version of the protocol:
C021H (LCP);
C023H (PAP);
C223H (CHAP); and
8021H (IPCP).
The support of other protocol identifiers is implementation dependent and outside the scope of the present document.
The protocol identifier contents field of each unit corresponds to a "Packet" as defined in RFC 1661 that is stripped off the "Protocol" and the "Padding" octets. The detailed coding of the protocol identifier contents field is specified in the RFC that is associated with the protocol identifier of that unit.
Additional parameters list (octets z + 1 to v)

The additional parameters list is included when special parameters and/or requests (associated with a PDP context) need to be transferred between the MS and the network. These parameters and/or requests are not related to a specific configuration protocol (e.g. PPP), and therefore are not encoded as the "Packets" contained in the configuration protocol options list.
The additional parameters list contains a list of special parameters, each one in a separate container. The type of the parameter carried in a container is identified by a specific container identifier.
In this version of the protocol, the following container identifiers are specified:
MS to network direction:

0001H (P-CSCF Address Request);
0002H (IM CN Subsystem Signaling Flag);
0003H (DNS Server Address Request); and
0004H (EMERGENCY TRAFFIC FLAG).
Network to MS direction:

0001H (P-CSCF Address);
0002H (IM CN Subsystem Signaling Flag);
0003H (DNS Server Address);
0004H (Policy Control rejection code); and
0005H (EMERGENCY TRAFFIC FLAG).
If the additional parameters list contains a container identifier that is not supported by the receiving entity the corresponding unit shall be discarded.
The container identifier field is encoded as the protocol identifier field and the length of container identifier contents field is encoded as the length of the protocol identifier contents field.
When the container identifier indicates P-CSCF Address Request or DNS Server Address Request, the container identifier contents field is empty and the length of container identifier contents indicates a length equal to zero. If the container identifier contents field is not empty, it shall be ignored.
When the container identifier indicates IM CN Subsystem Signaling Flag (see 3GPP TS 24.229 [95]), the container identifier contents field is empty and the length of container identifier contents indicates a length equal to zero. If the container identifier contents field is not empty, it shall be ignored. In Network to MS direction this information may be used by the MS to indicate to the user whether the requested dedicated signalling PDP context was successfully established.
When the container identifier indicates P-CSCF Address, the container identifier contents field contains one IPv6 address corresponding to a P-CSCF address (see 3GPP TS 24.229 [95]). This IPv6 address is encoded as an 128-bit address according to RFC 2373 [99].

TABLE 3-continued

When there is need to include more than one P-CSCF address, then more logical units with container identifier indicating P-CSCF Address are used.
When the container identifier indicates DNS Server Address, the container identifier contents field contains one IPv6 DNS server address (see 3GPP TS 27.060 [36a]). This IPv6 address is encoded as an 128-bit address according to RFC 2373 [99]. When there is need to include more than one DNS server address, then more logical units with container identifier indicating DNS Server Address are used.
When the container identifier indicates Policy Control rejection code, the container identifier contents field contains a Go interface related cause code from the GGSN to the UE (see 3GPP TS 29.207 [100]). The length of container identifier contents indicates a length equal to one. If the container identifier contents field is empty or its actual length is greater than one octect, then it shall be ignored by the receiver.
When the container identifier indicates the Emergency Traffic Flag, the container identifier contents field is empty and the length of container identifier contents indicates a length equal to zero.
If the container identifier contents field is not empty, it shall be ignored. In Network to MS direction this information may be used by the MS to indicate to the user whether the requested dedicated emergency PDP context was successfully established.

NOTE 1:
The additional parameters list and the configuration protocol options list are logically separated since they carry different type of information. The beginning of the additional parameters list is marked by a logical unit, which has an identifier (i.e. the first two octets) equal to a container identifier (i.e. it is not a protocol identifier).
NOTE 2:
The additional parameters list is discarded by a receiver, which does not support this list (e.g. a R99 GGSN).

The present invention also incorporates the special context information element in a packet data protocol address information element. The purpose of the packet data protocol address information element is to identify an address associated with a PDP. The packet data protocol address is a type 4 information element with minimum length of 4 octets and a maximum length of 20 octets. The packet data protocol address information element is coded with the special context information element as shown in Table 4, taken from 3GPP TS 24.008, figure 10.5.137 and table 10.5.155/3GPP TS 24.008.

TABLE 4

Packet data protocol address information element

| 8 | 7 | 6 | 5 | 4 | 3 | 2 | 1 | |
|---|---|---|---|---|---|---|---|---|
| Packet data protocol address IEI | | | | | | | | octet 1 |
| Length of PDP address contents | | | | | | | | octet 2 |
| 0 | 0 | 0 | 0 | PDP type organisation spare | | | | octet 3 |
| PDP type number | | | | | | | | octet 4 |
| Address information | | | | | | | | octet 5 |
| | | | | | | | | octet n | wherein the Length of the PDP address contents (octet 2) of the packet data protocol address information element of the present invention is coded as shown in Table 5, derived and modified from 3GPP TS 24.008, table 10.5.155, with the novel protocol configuration options of the present invention appearing as the Emergency Traffic Flag information element.

TABLE 5

Length of PDP address contents

Length of PDP address contents (octet 2)

If the value of octet 2 equals 0000 0010, then:
No PDP address is included in this information element; and
If the PDP type is IP, dynamic addressing is applicable.
NOTE: For PPP no address is required in this information element.
PDP type organisation (octet 3)
Bits
4 3 2 1
In MS to network direction:

0 0 0 0      ETSI allocated address
0 0 0 1      IETF allocated address
1 1 1 1      Empty PDP type
All other values are reserved.
In network to MS direction:

0 0 0 0      ETSI allocated address
0 0 0 1      IETF allocated address
All other values are reserved.
If bits 4, 3, 2, 1 of octet 3 are coded 0 0 0 0
PDP type number value (octet 4)
Bits
8 7 6 5 4 3 2 1
0 0 0 0 0 0 0 0      Reserved, used in earlier version of this protocol
0 0 0 0 0 0 0 1      PDP-type PPP
All other values are reserved
in this version of the protocol.
If bits 4, 3, 2, 1 of octet 3 are coded 0 0 0 1
PDP type number value (octet 4)
Bits
8 7 6 5 4 3 2 1
0 0 1 0 0 0 0 1      IPv4 address
0 1 0 1 0 1 1 1      IPv6 address
All other values shall be interpreted as IPv4 address
in this version of the protocol.
In MS to network direction:
If bits 4, 3, 2, 1 of octet 3 are coded 1 1 1 1
PDP type number value (octet 4)
bits 8 to 1 are spare and shall be coded all 0.
Octet 3, bits 8, 7, 6, and 5 are spare and shall be coded all 0.

If PDP type number indicates IPv4, the Address information in octet 5 to octet 8 contains the IPv4 address. Bit 8 of octet 5 represents the most significant bit of the IP address and bit 1 of octet 8 the least significant bit.

If PDP type number indicates IPv6, the Address information in octet 5 to octet 20 contains the IPv6 address. Bit 8 of octet 5 represents the most significant bit of the IP address and bit 1 of octet 20 the least significant bit.

Figure 4:
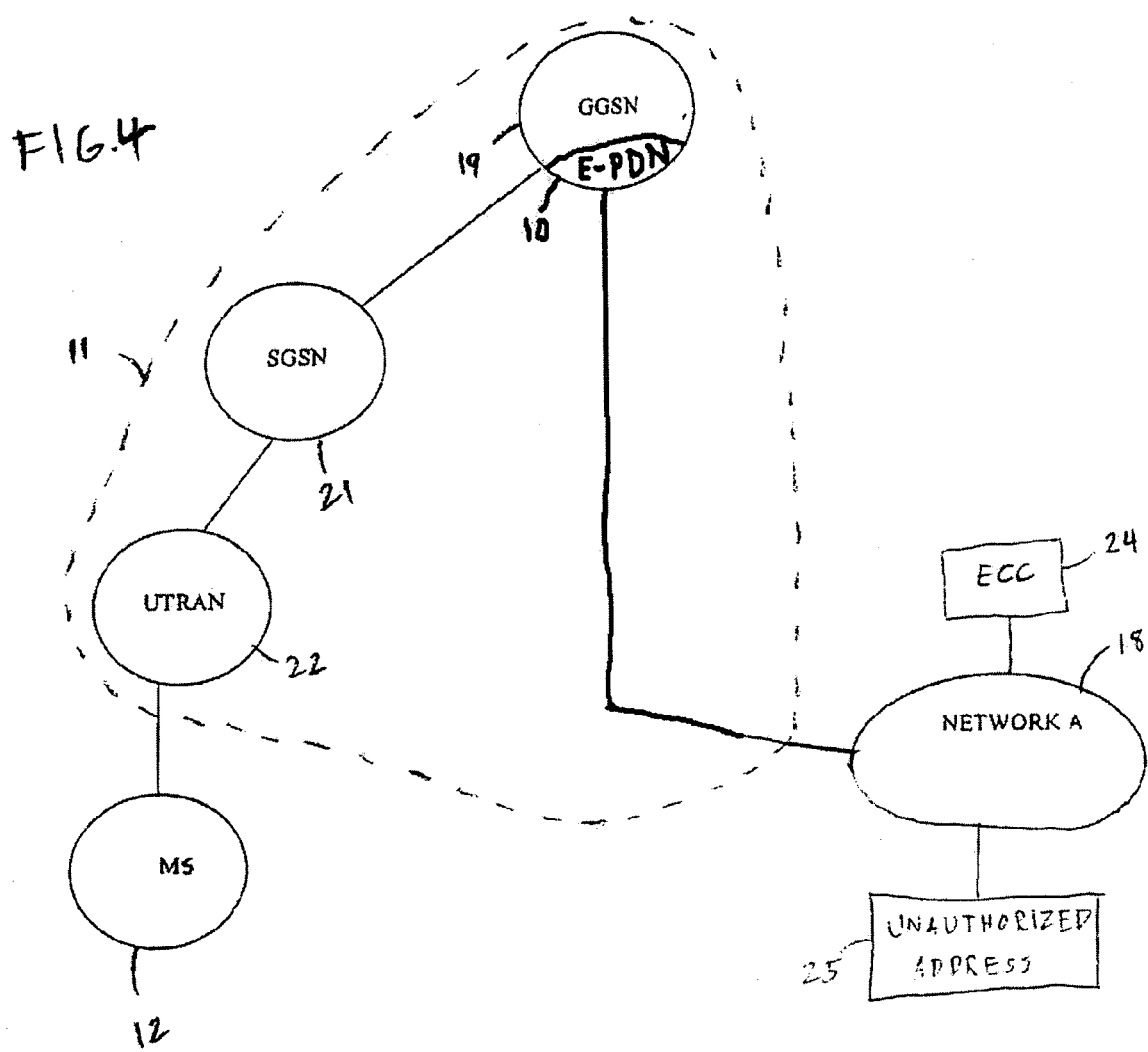
FIG. 4 shows a simplified schematic diagram of an anonymous mobile unit, networks, and called party, in accordance with an alternate embodiment of the present invention.
Figure 5:
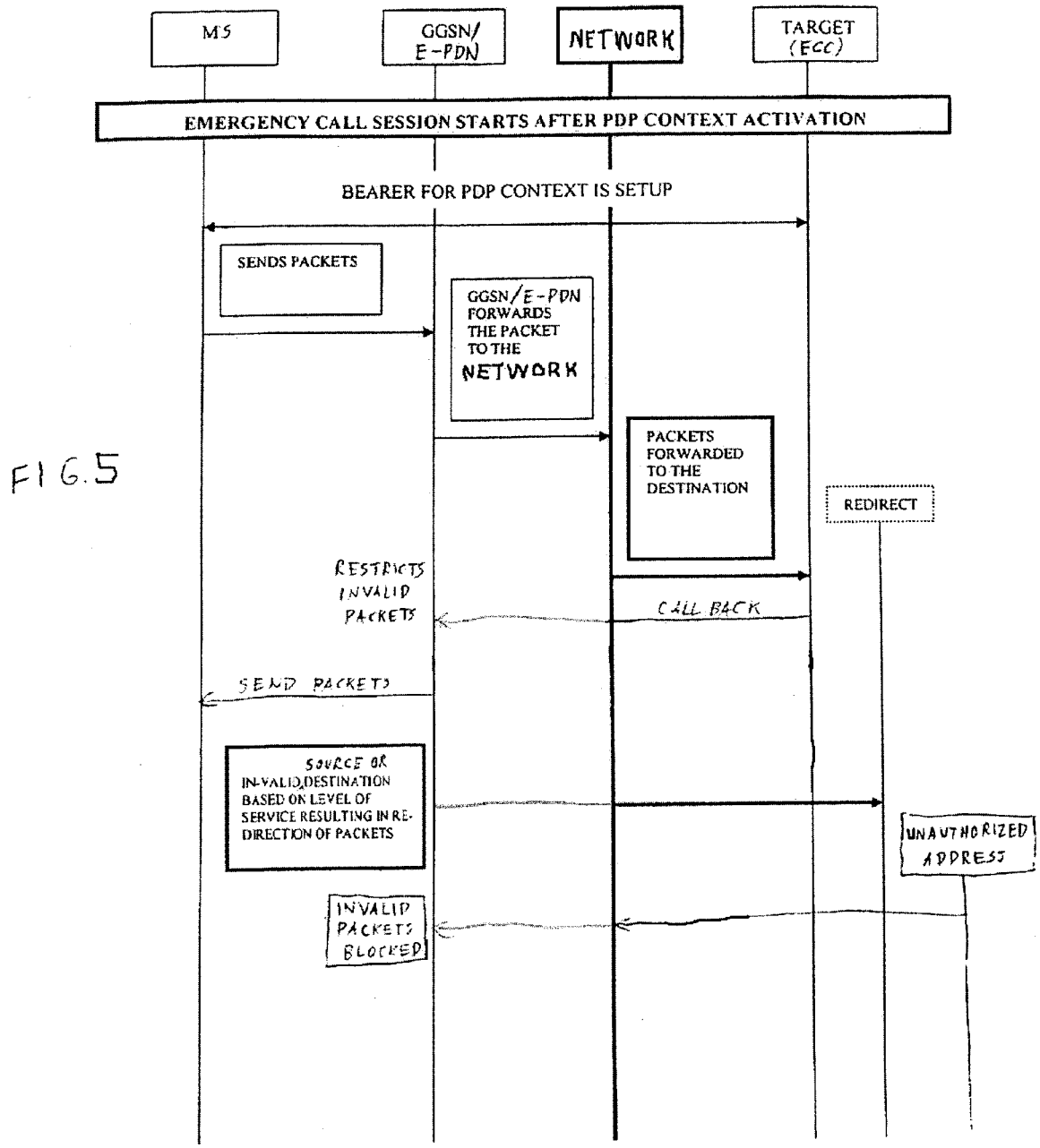
FIG. 5 illustrates the interaction between a mobile unit and a network, in accordance with the alternate embodiment of the present invention.

Referring to FIGS. 4 and 5, another example will be shown below where a mobile station makes an emergency call. In this example, a special context information element containing special context information is defined. For example, an emergency context information element can be defined containing emergency context information. Again, it is assumed that the mobile station has no identity, such as a SIM card or even a phone number. The mobile station 12 initiates the packet data emergency call by attaching to a UMTS Terrestrial Radio Access Network (UTRAN) 22, and activating a PDP context request with the SGSN 21. In this case, the special context information element is included in the activate packet data protocol (PDP) context request to the network. The MS initiates the GPRS attach procedure by the transmission of an Attach Request message to the SGSN 21. The Attach Request message contains protocol configuration options including the special context information element. If the MS is unidentified in the SGSN, the SGSN sends an Identity Request (Identity Type=Emergency IMSI) to the MS. The MS responds with Identity Response (Emergency IMSI).

As described earlier, the mobile user device includes an interim identity generator for generating the interim IMSI, a SIM detector, and a memory for storing local information, such as an IMEI, serial number, IMSI, and interim or emergency IP address information received from the network.

Upon receipt of the interim or emergency identity (IMSI), the SGSN 21 establishes a PDP context for the mobile station 12 with the GGSN 19 including the interim or emergency identity. The GGSN (or Emergency Packet Data Network contained therein) acknowledges the PDP Context and emergency identity, and allocates an IP address from a predetermined list therein and maps it to the emergency identity, which is stored and can be returned to the user device 12 for storage therein. The GGSN (or E-PDN) can also receive and identify any special context (e.g. emergency call) information element contained in the Attached Request message (i.e. activate PDP context request) and act accordingly. For example, upon receipt of an emergency call information element, the GGSN (or E-PDN) can configure data packets so that only the special (emergency) context is allowed.

The emergency call can then be setup between the GGSN/E-PDN and an Emergency Call Center using the IP address, whereupon a pipe (bearer) for the PDP context is setup for the transfer of packet data from the device to the target destination (e.g., ECC). The mobile station (MS) sends its first emergency call packets to the network (GGSN/E-PDN). Since the user device does not have a valid identity, an interim IP address is assigned (by the E-PDN), as described above. The GGSN then forwards the packets with the assigned interim IP address to the network for forwarding to an Emergency Call Center. The GGSN can also check to see if there are any non-authorized packets (e.g., not an emergency, presence of an adult supervision block, etc.) associated with the interim IP addresses. If the call is invalid, for having an improper authorization or source IP address, then the packets are restricted to a predetermined level of service access, blocked, and/or redirected to an authorized third party (e.g., parents, police) for review. However, if the call is valid, the packet networks are directed to forward the packet data along with the interim IP address to the address of a known target destination (e.g., ECC), depending on the class of the call (e.g., emergency). The call is completed normally through the networks 11, 18 to the emergency call center (e.g., though a public switched telephone network) using known procedures for the GPRS/UMTS system with the assigned interim IP address for the MS. At this point, the emergency call session proceeds normally and can be ended with a callback, as described previously.

However, if there is an attempt by an unauthorized address to send information to the interim IP address, the GGSN will recognize that the incoming IP address is not one of the known emergency IP addresses used in the original call and can block the invalid packets from reaching the user device. This provides an advantage since the ending of the emergency call does not necessary close the data pipe to the MS, and information from any other source could access the user device through the interim IP address without the GGSN being there to prevent this unauthorized use.

Figure 6:
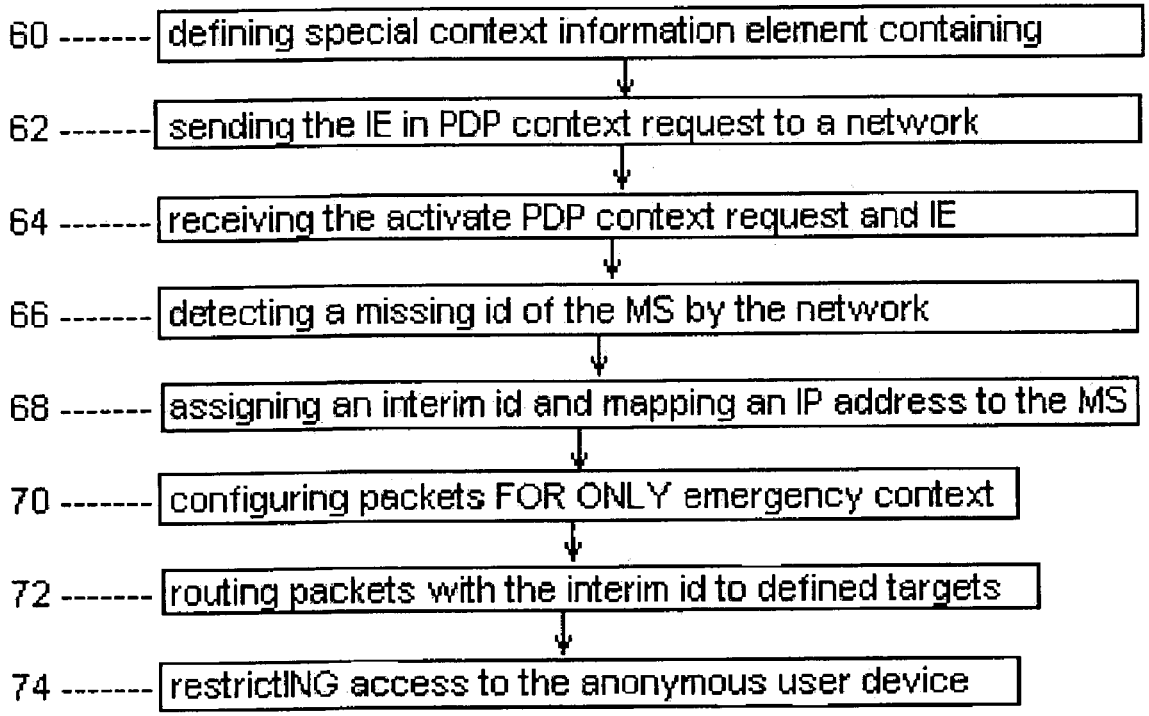
FIG. 6 illustrates a flow chart of the alternate method of anonymous operation, in accordance with the present invention.

FIG. 6 is a data flow diagram for a method of filtering packet data for an anonymous user device in a packet data network communication system, in accordance with the present invention. As illustrated, a first step 60 includes defining a special context information element containing special context information, such as an emergency context information element containing emergency context information. A next step 62 includes sending the special context information element in an activate packet data protocol (PDP) context request to a (home) network to initiate a call from an anonymous user device. Preferably, the special context information element is included in protocol configuration options of an activate PDP context request message. If the user device does not have a SIM card, an interim equipment identity, such as an emergency identity (IMSI or IMEI), is generated.

A next step includes receiving 64 the activate PDP context request and the special (emergency) context information element. A next step includes detecting 66 a missing identity of the user device by the (home) network. The network can determine whether a valid identity is missing and whether the particular call is an emergency from the special context information element. If so, the Gateway GPRS Service Node (GGSN) can configure 70 the data packets so that only the emergency context is allowed. A next step 68 includes allocating or assigning an interim identity and mapping an interim IP address to the user device, such as an emergency IP address assigned by the E-PDN from a predetermined list as explained above, which is stored. The E-PDN is associated with the network and is preferably contained within the GGSN of the packet data network.

The permissible target destination of the call is defined per the level of service access granted. For example, if the call is an emergency call, it can only be routed to known identities (i.e. IP addresses) of predetermined emergency calling centers (ECC). In addition, the present invention provides that the interim IP address of the user device can only be accessed (i.e. called back) by the IP address of ECC that was called. The GGSN performs this function by restricting access to data packets addressed to the assigned interim IP address of the anonymous user device that are not from a defined routing identity (ECC). At this time, the packets of the call can be routed 72 with the associated interim identity of the user device to only those target destinations defined above, such as the Emergency Call Center, and the call can proceed as normal.

In a preferred embodiment, the present invention can restrict 74 access to data packets addressed to the assigned interim IP address of the anonymous user device that are not from the known IP address of the emergency calling center, as described previously, for example, the restricting step can include one or more of the group of: redirecting the restricted data packets of the restricting step for reviewing by a third party, blocking access to data packets addressed to the assigned interim IP address of the user device that are not from the known IP address of the emergency calling center, and blocking data packets from the user device that do not have an emergency context.

The present invention has effect limiting the service access of an anonymous user device, such that the user device can only communicate with a predefined target destination. All other unauthorized (i.e. not having the proper level of service access) data packets, to or from the user device, are blocked or restricted. Moreover, the present invention provides that the blocked or restricted data packets of the restricting step are redirected for reviewing by a third party.

As a result, the present invention enables an anonymous call and callback for a specific purpose on a data packet network. Such data calls for example, occur for a third generation wireless mobile subscriber in the packet-switched data domains, while having minimum impact on the mobile device and network equipment, while at the same time offering a fairly wide range of access and service provision control options. Moreover, the present invention takes account of unauthorized network usage.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the broad scope of the invention.

What is claimed is:

1. A method for processing an emergency call from an anonymous user device in a packet data network communication system, the user device having an identity that is not valid for non-emergency use of the packet data network communication system, the method comprising:
   receiving an attach request message and an activate packet data protocol (PDP) context request message from an anonymous user device, the attach request message including at least an identity for the user device and the activate PDP context request message including at least a protocol configuration options information element;
   determining whether the identity for the user device is valid for non-emergency packet data communications in the packet data network communication system;
   determining whether the protocol configuration options information element indicates an emergency context;
   in the event that the protocol configuration options information element indicates an emergency context and the identity for the user device is not valid for non-emergency packet data communications in the packet data network communication system:
      determining that the activate PDP context request message is a request to establish an emergency context for an emergency call,
      determining an interim identify for the user device,
      establishing a PDP context for the emergency call, wherein the PDP context for the emergency call remains active through a predetermined callback period,
      assigning an interim internet protocol (IP) address to the user device for use during the PDP context for the emergency call only and associating the interim IP address to the interim identity for the user device, and
      determining at least one authorized IP address that is permitted to send data packets to and receive data packets from the interim IP address while the PDP context for the emergency call is active, wherein the at least one authorized IP address corresponds to at least one device used to provide communication for emergency services in response to the emergency call;
   receiving data packets while the PDP context for the emergency call is active;
   determining whether the received data packets include the interim IP address and the at least one authorized IP address;
   in the event that the received data packets include the interim IP address and the at least one authorized IP address, routing the received data packets between the interim IP address and the at least one authorized IP address; and
   in the event that the received data packets include the interim IP address but not the at least one authorized IP address, blocking the received data packets from being routed in the packet data network communication system to thereby prohibit communication between the interim IP address and unauthorized IP addresses while the PDP context for the emergency call is active.

2. The method of claim 1, wherein the protocol configuration options information element includes an emergency traffic flag to indicate the emergency context.

3. The method of claim 1, wherein the step of establishing the PDP context for the emergency call is at least partially performed by a Gateway GPRS Support Node (GGSN) of the packet data network communication system.

4. The method of claim 2, wherein the protocol configuration options information element includes an additional parameters list, wherein the additional parameters list includes a plurality of container identifiers, and wherein a container identifier of the plurality of container identifiers identifies the emergency traffic flag.

5. The method of claim 4, wherein wherein when a container identifier identifies the emergency flag, a length of a contents field of the container identifier is set to zero.

6. The method of claim 1, wherein the authorized IP addresses correspond to IP addresses of emergency call centers only.

7. The method of claim 1, wherein a list of interim IP addresses for assigning to anonymous user devices is controlled by an emergency packet data network of the packet data network communication system.

8. A method of emergency packet data communications involving an anonymous user device in a packet data network communication system, the user device having an identity that is not valid for non-emergency use of the packet data network communication system, the method comprising the steps of:
   generating, by the user device, an attach request message and an activate packet data protocol (PDP) context request message for an emergency call, the attach request message including at least the identity of the user device and the activate PDP context request message including at least a protocol configuration options information element, the protocol configuration options information element indicating an emergency context for the emergency call;
   sending, by the user device, the attach request message and the activate PDP context request message to a home packet data network of the packet data network communication system to request an emergency packet data connection for the emergency call;
   receiving, at the home packet data network, the attach request message and the activate PDP context request message for the emergency call;
   determining, by the home packet data network, whether the identity of the user device is valid for packet data communications in the packet data network communication system;
   determining, by the home packet data network, whether the protocol configuration options information element includes an emergency traffic flag;
   in the event that the protocol configuration options information element includes an emergency traffic flag and the identity of the user device is not valid for packet data communications in the packet data network communication system:
      determining, by the home packet data network, that the activate PDP context request message is a request to establish a PDP context for an emergency call,
      establishing, by the home packet data network, the PDP context for the emergency call, wherein the PDP context for the emergency call remains active through a predetermined callback period, and determining, by the home packet data network, an interim identity for the user device for use during the PDP context for the emergency call only;
assigning, by an emergency packet data network coupled to the home packet data network, an interim internet protocol (IP) address to the user device for use during the PDP context for the emergency call only and associating the interim identity for the user device to the interim IP address;
determining, by the emergency packet data network, an IP address for an emergency calling center that is authorized to send data packets to and receive data packets from the interim IP address while the PDP context for the emergency call is active;
receiving, by the emergency packet data network, data packets while the PDP context for the emergency call is active;
in the event that the received data packets include the interim IP address and the IP address of the emergency calling center, routing, by the emergency packet data network, the received data packets between the interim IP address and the IP address of the emergency calling center; and
in the event that the received data packets include the interim IP address but not the IP address of the emergency calling center, restricting, by the emergency packet data network, access to the received data packets to thereby prohibit communication between the interim IP address and unauthorized IP addresses while the PDP context for the emergency call is active.

9. The method of claim 8, wherein the restricting step comprises one or more of the group of: redirecting the received data packets to a third party for review, and blocking access to the received data packets.

10. The method of claim 8, wherein the protocol configuration options information element includes an additional parameters list and wherein the additional parameters list includes the emergency traffic flag.

11. The method of claim 10, wherein the additional parameters list includes a plurality of container identifiers and wherein a container identifier of the plurality of container identifiers identifies the emergency traffic flag.

12. The method of claim 8, wherein a list of interim IP addresses for assigning to anonymous user devices is controlled by the emergency packet data network.

13. A packet data network communication system capable of providing emergency packet data communications for anonymous user devices having identities that are not valid for non-emergency use of the packet data network communication system, the packet data network communication system comprising:
a public packet data network operable to at least:
  receive an attach request message and an activate packet data protocol (PDP) context request message for an emergency call from an anonymous user device, the attach request message including at least the identity of the user device and the activate PDP context request message including at least a protocol configuration options information element,
  determine whether the identity of the user device is valid for packet data communications in the packet data network communication system,
  determine whether the protocol configuration options information element indicates an emergency context,
  in the event that the protocol configuration options information element indicates an emergency context and the identity of the user device is not valid for packet data communications in the packet data network communication system:
    determine that the activate PDP context request message is a request to establish a PDP context for an emergency call,
    establish the PDP context for the emergency call, wherein the PDP context for the emergency call remains active through a predetermined callback period, and
    determine an interim identity for the user device to use during the PDP context for the emergency call only;
an emergency packet data network coupled to the public packet data network, the emergency packet data network being operable to at least:
  receive the interim identity for the user device from the public packet data network,
  assign an interim IP address to the user device for use during the PDP context for the emergency call only and associate the interim IP address with the interim identity for the user device,
  determine at least one authorized IP address that is authorized to send data packets to and receive data packets from the interim IP address while the PDP context for the emergency call is active,
  receive data packets while the PDP context for the emergency call is active,
  in the event that the received data packets include the interim IP address and the at least one authorized IP address, route the received data packets between the interim IP address and the at least one authorized IP address, and
  in the event that the received data packets include the interim IP address but not the at least one authorized P address, restrict access to the received data packets to thereby prohibit communication between the interim IP address and unauthorized IP addresses while the PDP context for the emergency call is active.

14. The packet data network communication system of claim 13, wherein the protocol configuration options information element includes an emergency traffic flag to indicate the emergency context and wherein the at least one authorized IP address is an IP address of an emergency calling center.

15. The packet data network system of claim 13, wherein the public packet data network includes a Gateway GPRS Support Node (GGSN) and wherein the emergency packet data network is contained within the GGSN.

16. The packet data network communication system of claim 13, further comprising the user device.

* * * * *